A. SONSTHAGEN.
MACHINE FOR MIXING LIQUID, SEMILIQUID, OR VISCID MATERIALS.
APPLICATION FILED MAR. 4, 1920.

1,363,368.

Patented Dec. 28, 1920.

Witnesses:

Inventor:
Asbjorn Sonsthagen,
By his Atty,

UNITED STATES PATENT OFFICE.

ASBJORN SONSTHAGEN, OF ESSEX, ENGLAND.

MACHINE FOR MIXING LIQUID, SEMILIQUID, OR VISCID MATERIALS.

1,363,368.  Specification of Letters Patent.  Patented Dec. 28, 1920.

Application filed March 4, 1920. Serial No. 363,344.

*To all whom it may concern:*

Be it known that I, ASBJORN SONSTHAGEN, a subject of the King of Norway, residing in Essex, England, have invented certain new and useful Improvements in Machines for Mixing Liquid, Semiliquid, or Viscid Materials, of which the following is a specification.

This invention relates to an improved machine for mixing liquid, semi-liquid, or viscid materials and it has for its object to provide a simple and efficient machine whereby the mixing of the materials may be expeditiously, continuously and economically effected.

While particularly adapted for mixing cream or chocolate for sweetmeats, a machine according to this invention is also adapted for mixing other materials.

The present invention has for its further object certain improvements in machines of this type in accordance with which the machine is provided at the discharge end with a discharge device which is so constructed and arranged that the outlet or spout thereof may be arranged at any desired angle whereby the container may be kept full when it is desired to prevent the entry of air.

When dealing with a stiff paste or more or less viscid material, by turning the discharge device it is possible to arrange for the actual discharge of the material to take place at a point above the level of the contents of the mixing chamber. By this means the material itself forms a seal preventing the entry of the air. A suitable steam or hot water jacket may be provided for the mixing chamber.

When dealing with a material such as chocolate for example it is desirable that the mixing vessel shall be closed to exclude the air, but when dealing with sugar syrup for the making of the so called cream of which the cores of chocolate are formed, it is necessary that the air shall be admitted. To this end therefore the mixing chamber upon the upper portion of its circumference is provided with an opening running longitudinally of the said chamber and closed by means of a suitable grid or grating. When so desired the grid or grating may be removed and replaced by an imperforate cover. In order to assist the action of the stirring blades or vanes the mixing chamber or the said cover may be provided with ribs or the like which may be formed solid with the wall of the chamber or separate therefrom projecting into said mixing chamber and so disposed that they are clear of the blades or vanes as they rotate.

In order that the invention may be the better understood drawings are appended in which:—

Figure 1:
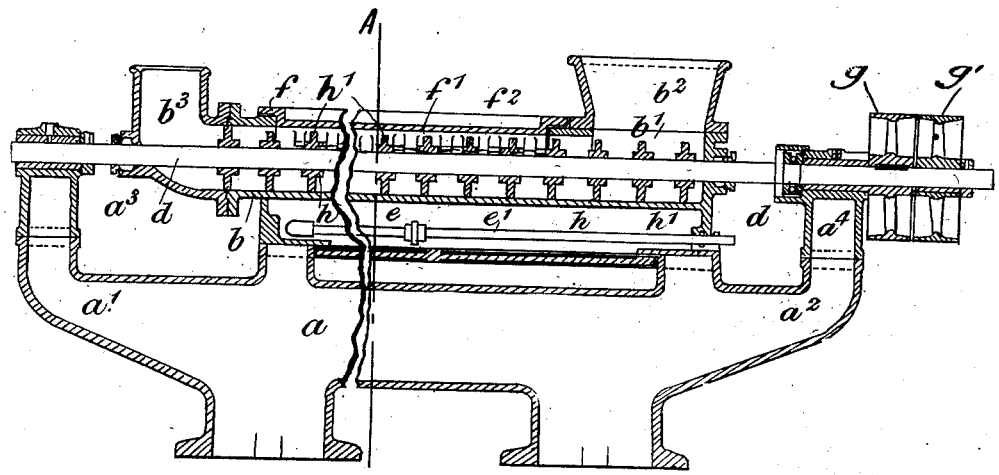
Figure 1 is a longitudinal section of a form of machine according to this invention.
Figure 2:
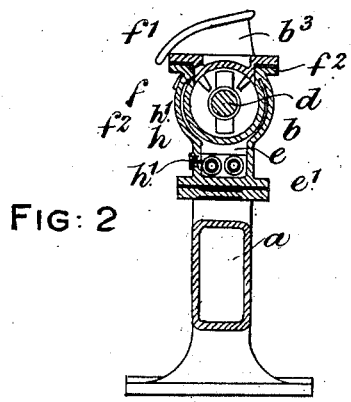
Fig. 2 is a transverse section on line A A Fig. 1.
Figure 3:
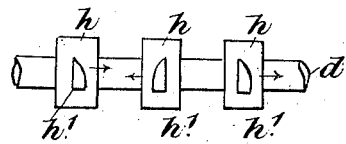
Fig. 3 is a plan showing more clearly in diagrammatic form the arrangement of the helically disposed bodies for effecting the oscillatory motion of the material.

Referring to the accompanying drawings $a$ indicates the frame of the machine supporting a horizontally disposed tubular body $b$, which body, in the example illustrated, is formed integrally with the frame $a$. The frame $a$ at each end is provided with extensions $a^1$ $a^2$ to which are secured bearings $a^3$ $a^4$ in which is supported a shaft $d$ disposed longitudinally of the body $b$ and concentrically disposed therein. $e$ indicates a jacket within which is disposed a steam coil or other heating device indicated by $e^1$. The body $b$ at one end is provided with an opening $b^1$ to which is connected a mouth or hopper $b^2$ by which the material is fed into the body $b$ and at the other end of said body $b$ is provided with a discharge chute indicated by $b^3$ and which chute is so arranged that it may be swung in either direction for the discharge of the material. Suitable stuffing boxes and glands are provided at the ends of the body $b$ for the passage of the shaft $d$. An opening indicated by $f$ is provided upon the top of the body $b$ for which a suitable closure $f^1$ is provided. Provision is made by means of fast and loose pulleys $g$ $g^1$ whereby motion may be imparted to shaft $d$. Secured at intervals along the length of the shaft $d$ are collars $h$ each provided at diametrically opposite points with projections or blades $h^1$. The collars may be turned slightly one with regard to the other so that the blades $h^1$ are disposed on helical lines, or, as in the example illustrated, the blades are arranged in two lines all those of one direction being on one side of the shaft and those of opposite direction upon the other side. It will be understood that the shape and inclination of the working surface of the blades is such that one will feed the material forward a certain distance while the other will cause it to travel in an opposite direction, backward, as shown in Fig. 3, the extent of its movement in the backward direction, however, being less than the extent of its forward movement. By this means the material travels with an oscillating or vibrating movement from one end of the body $b$ to the other.

In Fig. 3 one of the collars is shown as turned through an angle of 360° showing approximately the outline of the acting surface thereof.

In order to assist the action of the blades $h^1$ the under-surface of the closure $f^1$ may be provided with ribs or projections $f^2$ which are so placed that while they project within the circle described by the ends of the blades they are clear thereof as the said blades rotate.

By placing the outlet of the chute on a periphery of greater radius than the radius of the casing and providing means for turning said chute at different angles in order to vary the height of the outlet, one is able thereby to vary the pressure at which material is fed through the casing.

By using the chute in said way, the pressure will be variable accordingly, and consequently the amount of material fed through the machine would vary with the pressure, more or less, according to consistency of material. If, for instance, the machine is kept at a certain temperature, being heated or cooled by a jacket, by varying the pressure whereby one may vary the quantity of material passing through the machine, it is possible to vary the temperature of the material and the adjustable chute becomes a simple means of controlling the temperature.

Claims:

1. In combination, a casing; and an adjustable chute joining the end of the casing and projecting from the axis of the casing, and means for forcing material through the casing and out through the chute.

2. In combination, a horizontal casing; a chute joining the end of the casing and projecting upwardly from the axis of the casing a distance greater than the radius of the casing; and means for feeding material through the casing out through the chute.

3. In combination, a horizontal casing; a revolubly adjustable angularly turned chute joining the end of the casing; and means for forcing material through the casing out through the chute.

4. In combination, a horizontal casing; an adjustably revoluble substantially right-angularly turned open-mouthed chute joining the end of the casing and projecting from the axis of the casing a distance greater than the radius of the casing; and means for feeding material through the casing.

5. In combination, a horizontal casing; an angularly turned open-mouthed discharge chute joining the discharge end of the casing and projecting from the axis of the casing a distance greater than the radius of the casing, and means for feeding material through the casing.

6. In combination, a horizontal cylindrical casing having an inlet hopper communicating with the top part of its inlet end; and adjustably revoluble substantially right-angularly turned open-mouthed discharge chute joining the discharge end of the casing and projecting from the axis of the casing a distance greater than the radius of the casing; a shaft passing through said casing; blades secured to said shaft; and means for rotating the shaft.

7. In combination, a horizontal cylindrical casing having an inlet hopper communicating with the top part of its inlet end; an adjustably revoluble substantially right-angularly turned open-mouthed discharge chute joining the discharge end of the casing and projecting perpendicularly to the axis of the casing a considerable distance greater than the radius of the casing and having its cross-sectional area approximating that of the casing; a shaft passing through said casing; inclined blades secured to said shaft; and means for rotating the shaft.

8. In combination, a casing having an elongated opening on the top of the casing and terminating short of the ends of the casing; and means for feeding material through said casing.

9. In combination, a horizontal casing having an inlet hopper communicating with the top part of its inlet end and an elongated opening on the top of the casing terminating short of the discharge end; and means for feeding through said casing.

10. In combination, a horizontal cylindrical casing having an inlet hopper communicating with the top part of its inlet end, and an elongated opening on the top of the casing and terminating short of said hopper and short of the discharge end of the casing; a discharge chute at the discharge end of the casing; an axial shaft passing through said casing; blades secured to said shaft; and means for rotating said shaft.

11. In combination, a casing having an inlet end and a discharge end and having an elongated opening between ends; a removable closure for said elongated opening; a shaft passing through said casing; a set of inclined blades secured to said shaft; a second set of inclined blades secured to said shaft and of opposite permanent pitch from the blades of the first set; and means for rotating said shaft.

12. In combination, a casing having an inlet end and an outlet end and an elongated opening between said ends; a shaft passing through said casing; a set of inclined blades secured to said shaft; a second set of helical blades secured to said shaft and alternating with the alternating blades of the first set having different permanent pitch from the blades of the first set; a removable closure for said opening provided with projections projecting inwardly between said blades; and means for rotating said shaft.

13. In combination, a casing; a shaft passing through said casing; blades secured to said shafts; projections secured to the inner face of said casing; and means for rotating said shaft.

14. In combination, a horizontal cylindrical casing; a shaft passing axially through said casing; sets of blades secured to said shafts; a set of projections secured to said casing and staggered with said blades; and means for rotating said shaft.

15. In combination, a horizontal casing; a shaft passing longitudinally through said casing; sets of inclined blades secured to said shaft; a set of projections secured to said casing and free of connections with the shaft and staggered with said blades; and means for rotating said shaft.

16. In combination, a horizontally cylindrical casing; a shaft passing axially through said casing; sets of inclined blades secured to said shaft and having different and opposite pitches; a set of projections secured to said casing and free of connections with the shaft and alternating with said blades; and means for rotating said shaft.

17. In combination, a horizontal casing; a revoluble adjustable angularly turned chute joining the end of the casing and adapted to be turned up or down; and means for forcing material through the casing.

18. In combination, a casing; means for forcing material through the casing; and associated with the casing for varying the pressure at which material in the casing is fed through the opening.

19. In combination, a casing; means for forcing material through the casing; a discharge chute joining the casing, the effective height of the outlet of the chute being adjustable above the casing.

20. In combination, a casing; means for forcing material through the casing; a discharge chute joining the casing, the effective height of the outlet of the chute being adjustable in order to vary the height of the outlet and thereby varying the pressure at which material is fed through the casing.

21. In combination, a horizontal casing; a chute joining the end of the casing, the outlet of the chute being on a periphery greater than the radius of the casing, means for turning said chute at different angles in order to vary the height of the outlet and thereby varying the pressure at which material is fed through the casing.

In witness whereof I have hereunto set my hand in the presence of two witnesses.

ASBJORN SONSTHAGEN.

Witnesses:
  EDMUND H. HARBERD,
  O. P. HIBLETE.